United States Patent [19]

Sedlock

[11] 4,151,973
[45] May 1, 1979

[54] SPRING CONTROLLED SHOCK ABSORBING SEAT

[76] Inventor: Carl P. Sedlock, Rte.#2, Box 127, Wilmington, Ill. 60481

[21] Appl. No.: 859,018

[22] Filed: Dec. 8, 1977

[51] Int. Cl.² .......................................... F16M 13/00
[52] U.S. Cl. ................... 248/576; 248/421; 248/429; 248/588; 248/590
[58] Field of Search ............... 248/370, 376, 377, 399, 248/419, 420, 421, 429, 430; 297/307, 308

[56] References Cited

U.S. PATENT DOCUMENTS

| | | | |
|---|---|---|---|
| 2,289,854 | 7/1942 | Permann et al. | 248/376 |
| 2,620,855 | 12/1952 | Stone | 248/399 X |
| 2,877,825 | 3/1959 | Olson | 248/376 |
| 2,916,082 | 12/1959 | Wilkinson et al. | 248/376 |
| 3,120,371 | 2/1964 | Dall | 248/430 X |
| 3,437,304 | 4/1969 | Decker | 248/399 |
| 3,504,881 | 4/1970 | Pillons et al. | 248/399 |
| 3,602,475 | 8/1971 | Sedlock | 248/399 |
| 3,685,780 | 8/1972 | Stannebein | 248/399 |
| 3,823,932 | 7/1974 | Simons | 248/399 X |
| 3,957,243 | 5/1976 | Costin et al. | 248/430 X |

FOREIGN PATENT DOCUMENTS

| | | | |
|---|---|---|---|
| 30343 | 5/1926 | France | 248/399 |
| 188419 | 3/1964 | Sweden | 248/399 |

Primary Examiner—Lawrence J. Staab
Attorney, Agent, or Firm—Clarence A. O'Brien; Harvey B. Jacobson

[57] ABSTRACT

A seat mounting structure is provided including a stationary base and a generally horizontal seat support assembly disposed above the base. Spring controlled pivoted levers and connecting links support the assembly above the base for vertical movement relative thereto between upper and lower limit positions while maintaining the seat support generally horizontally disposed. Controlling springs of the seat mounting structure include a first pair of springs which are progressively tensioned as the seat support assembly is moved from its upper limit position to its lower limit position and a second pair of springs which are pretensioned and which are further tensioned, considerably more gradually than the first pair of springs, as the seat support assembly is moved from its upper limit position to its lower limit position. In addition, adjustment structure is provided whereby the tension of the first and second pairs of springs may be rapidly and selectively adjusted.

14 Claims, 6 Drawing Figures

SPRING CONTROLLED SHOCK ABSORBING SEAT

BACKGROUND OF THE INVENTION

Various forms of shock absorbing seat structures have been heretofore provided. Examples of various forms of seat structures including some of the general structural and operational features of the instant invention are disclosed in U.S. Pat. Nos. 2,633,897, 2,916,082, 3,109,621, 3,140,851, 3,144,270 and 3,761,045. In addition, more similar shock absorbing seat structures are disclosed in my prior U.S. Pat. Nos. 2,916,082 and 3,602,475.

BRIEF DESCRIPTION OF THE INVENTION

The shock absorbing seat structure of the instant invention has been specifically designed to provide a support assembly upon which a seat cushion may be mounted and which will support the associated seat cushion for generally vertical movement between upper and lower limit positions with spring means being provided to yieldingly bias the seat support assembly toward its uppermost limit position. The spring means provided is connected between the seat support assembly and the base from which the support assembly is mounted in a manner such that downward movement of the seat support assembly is progressively resisted by one set of pretensioned springs whose tension is rapidly increased during movement of the seat support assembly toward its lower limit position and a second set of pretensioned springs whose tension if more slowly increased during movement of the seat support assembly toward its lower limit position.

The seat support assembly is supported in an elevated position above the base by means of spring controlled pivoted levers and connecting links and the biasing action of the springs resisting downward movement of the seat support assembly is operative to effect compensation for persons of different weight seated on a seat cushion mounted on the seat support assembly. In addition, the ability of the pairs of springs to be adjustably enables the shock absorbing seat to be adjusted for use over smooth roads or rough roads.

The main object of this invention is to provide a seat mounting structure which will be capable of supporting a seat cushion for vertical movement between upper and lower limit positions and which will yieldingly resist downward movement of the supported seat.

Another object of this invention is to provide a seat mounting structure which will be particularly well adapted to yieldingly support the seat cushion of vehicles to travel over smooth roads as well as vehicles to travel over rough roads.

Still another object of this invention is to provide a shock absorbing seat structure for use in various environments but specifically adapted for use as the seat for the operator of trucks and buses and which will provide a spring mount for a seat cushion that will automatically compensate for the weight of the driver supported therefrom.

Another important object of this invention is to provide a seat support for a seat cushion which will afford a high degree of resiliency with a minimum amount of "springboard" sensation.

A final object of this invention to be specifically enumerated herein is to provide a shock absorbing seat structure in accordance with the preceding objects and which will conform to conventional forms of manufacture, be of simple construction and dependable in operation, so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
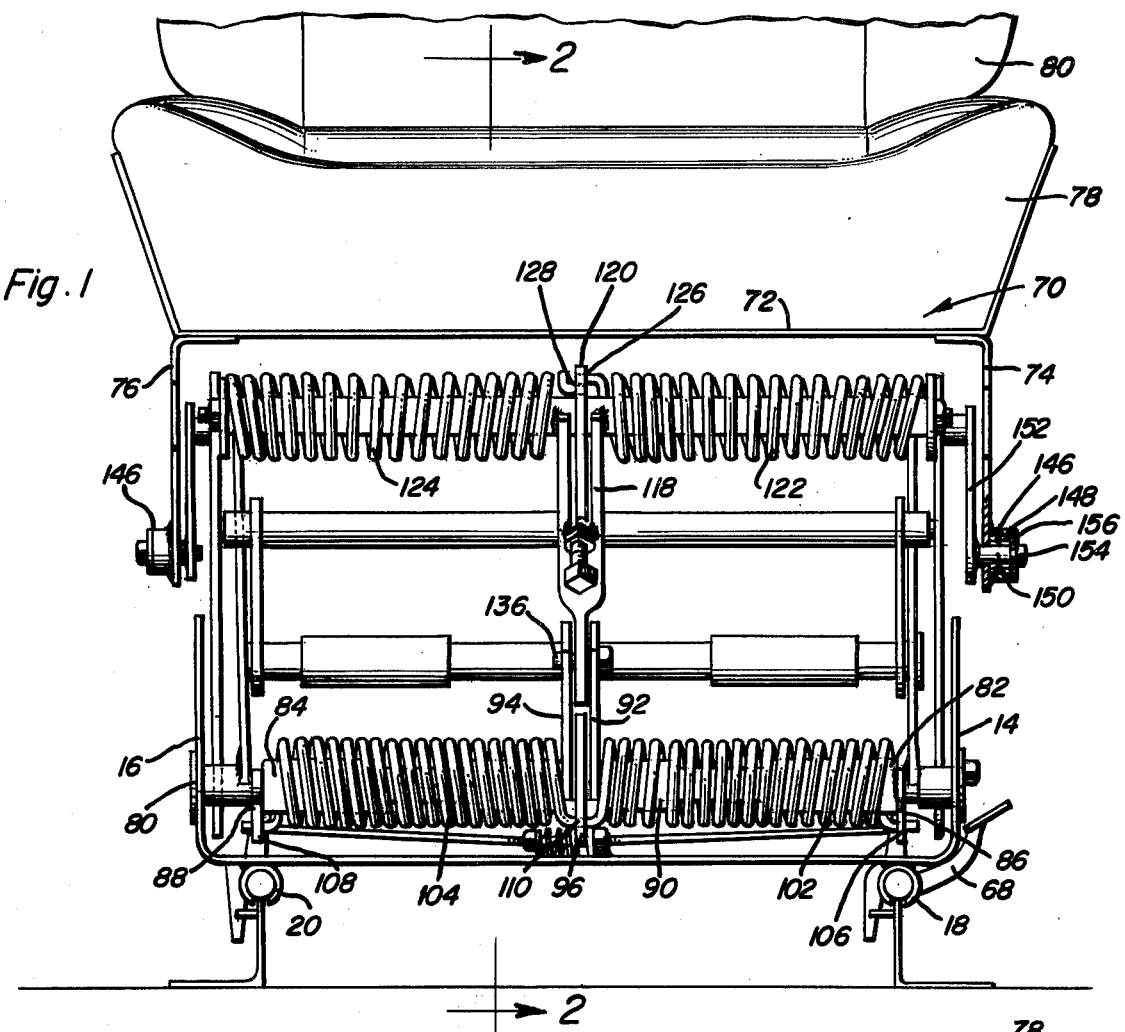
FIG. 1 is a front elevational view of the shock absorbing seat supporting structure of the instant invention.

Referring now more specifically to the drawings, the numeral 10 generally designates a base including a horizontal mounting panel 12 provided with upstanding opposite side front to rear extending flanges 14 and 16. Opposite side marginal portions of the panel 12 include cylindrical followers 18 and 20 secured to their undersides and extending therealong. The lower peripheral portions of the followers 18 and 20 are slotted as at 22 and each follower 18 and 20 includes axially spaced front and rear sections 24 and 26. A pair of opposite side angle members 28 are provided and include lower horizontal mounting flanges 30 and upstanding flanges 32 having cylindrical guide bars 34 secured to and extending along their upper marginal edge portions, the flanges 32 being slotted as at 36. The pairs of corresponding follower sections 24 and 26 are slidably engaged with the corresponding guide bars 34 and each of the mounting plates 12 is slotted as at 38 and receives a pair of bell cranks 40 and 42 therethrough. The bell cranks 40 and 42 include mounting sleeve portions 44 rotatably mounted on the corresponding guide bars 34 in registry with the associated slots 36 for movement along the latter and the bell cranks 40 and 42 include operating arms 46 and 48 interconnected by means of a connecting link 50 slidable through a guide 52 supported from the upper surface of the mounting plate 12 centrally intermediate its opposite ends. The connecting link 50 has an abutment 54 mounted thereon for movement therewith and a compression spring 56 is disposed about the connecting link 50 and between the guide 52 and the abutment 54 whereby the connecting link 50 is spring biased to the left as viewed in FIG. 4 of the drawings.

Figure 4:
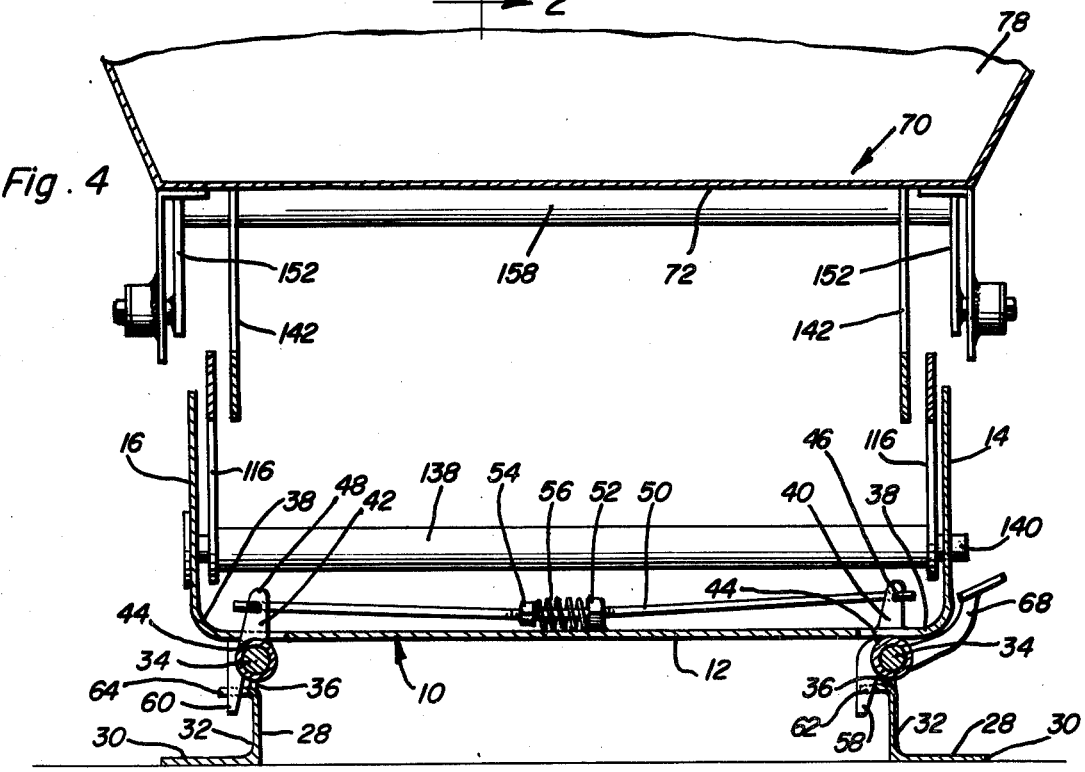
FIG. 4 is a transverse, vertical sectional view taken substantially upon the plane indicated by the section line 4—4 of FIG. 2.

The bell cranks 40 and 42 further include locking tangs 58 and 60 engageable with longitudinally notched flanges 62 and 64 carried by the right and the left hand vertical flanges 32 illustrated in FIG. 4 for retaining the followers 18 and 20 in adjusted positions along the guide bars 34. The bell crank 40 includes an actuating lever 68 which may be depressed in order to swing the locking tangs 58 and 60 out of engagement with the notched flanges 62 and 64 to thereby allow free movement of the followers 18 and 20 along the guide bars 34. In this manner, the front to rear positioning of the mounting panel 12 relative to the angle members or brackets 28 may be adjusted.

A seat support structure referred to in general by the reference numeral 70 is also provided and includes a horizontal mounting plate 72 having opposite side depending flanges 74 and 76. A seat cushion 78 and a seat back 80 are supported from the mounting panel 72.

Figure 2:
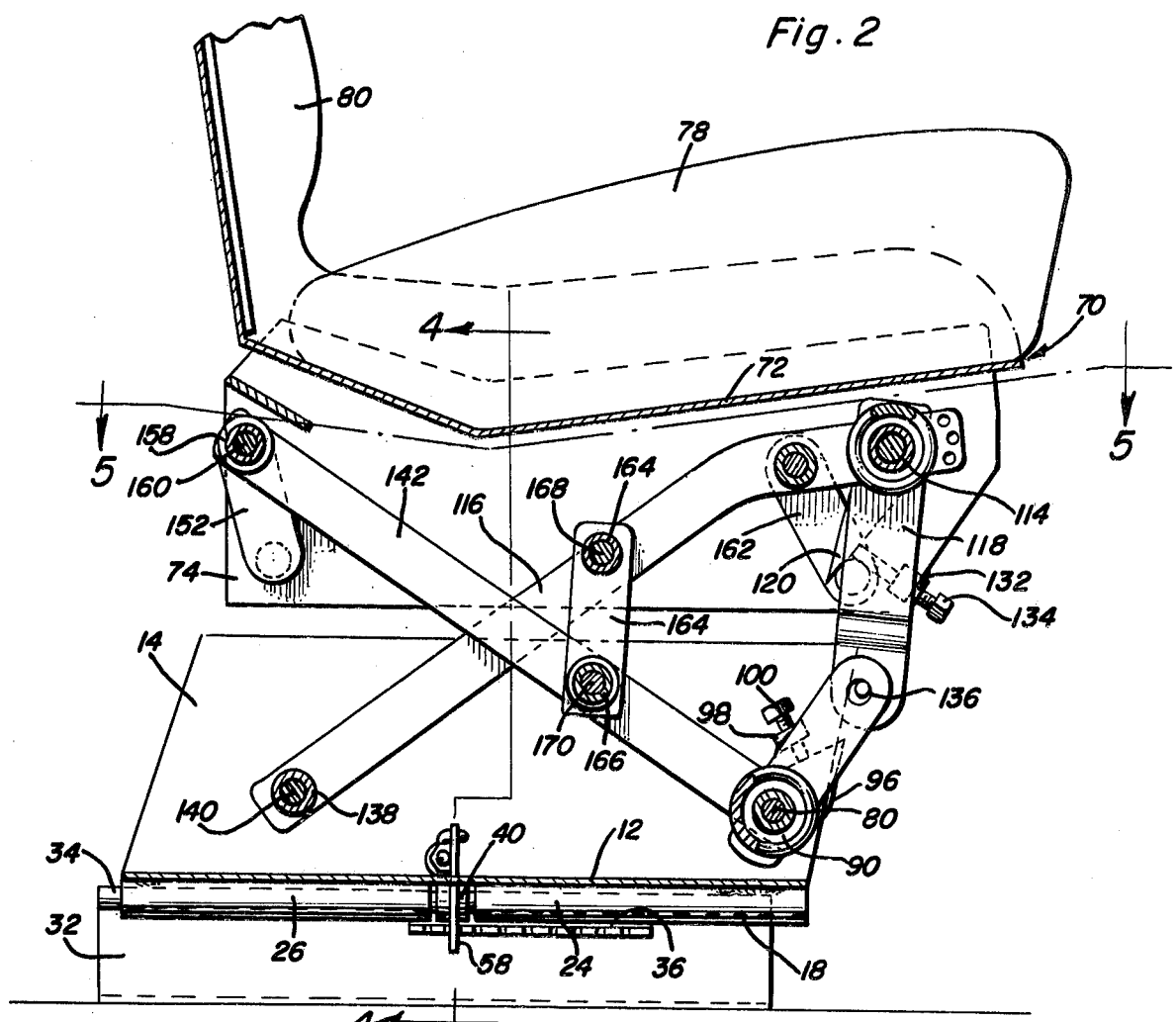
FIG. 2 is a fragmentary, vertical sectional view taken substantially upon the plane indicated by the section line 2—2 of FIG. 1 and with the seat supporting structure in its upper limit position.
Figure 3:
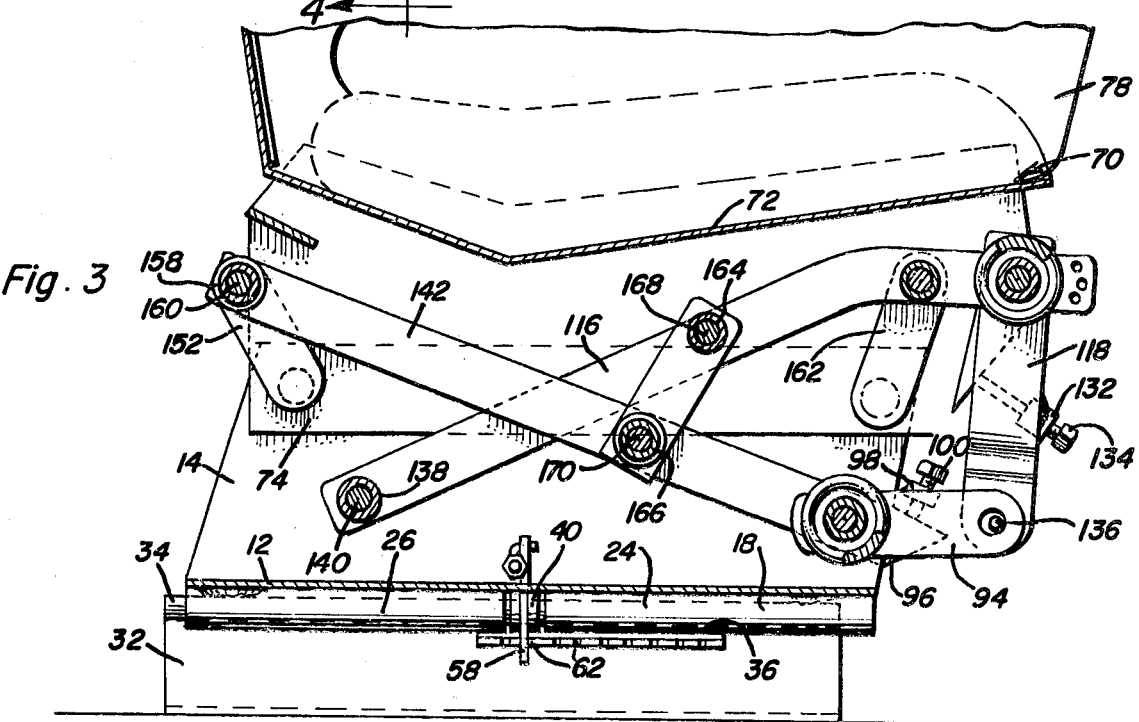
FIG. 3 is a fragmentary, sectional view similar to FIG. 2 but illustrating the seat supporting structure in its lower limit position.

With attention now invited more specifically to FIGS. 1 through 3 of the drawings, a lower shaft 82 extends between and is secured through the forward marginal portions of the flanges 14 and 16. A pair of opposite end sleeves 82 and 84 are rotatable on the opposite ends of the shaft 80 inwardly of the flanges 14 and 16 and include integral anchor tabs 86 and 88. In addition, a center sleeve 90 is rotatable on the shaft 80 and includes a pair of parallel crank arms 92 and 94. A lever arm 96 is rotatable on the sleeve 90 and a threaded nut 98 is secured between the rear sides of the crank arms 92 and 94 intermediate their opposite ends and has an adjustment screw 100 threadedly secured therethrough and engaged with the lever arm 96. A pair of opposite side coil springs 102 and 104 are disposed about the sleeves 82 and 84 as well as the corresponding ends of the shaft 80 and the sleeve 90. The remote ends of the springs 102 and 104 are anchored to the anchor tabs 86 and 88 as at 106 and 108 and the adjacent ends of the springs 102 and 104 are anchored to the lever arm 96 as at 110.

Figure 5:
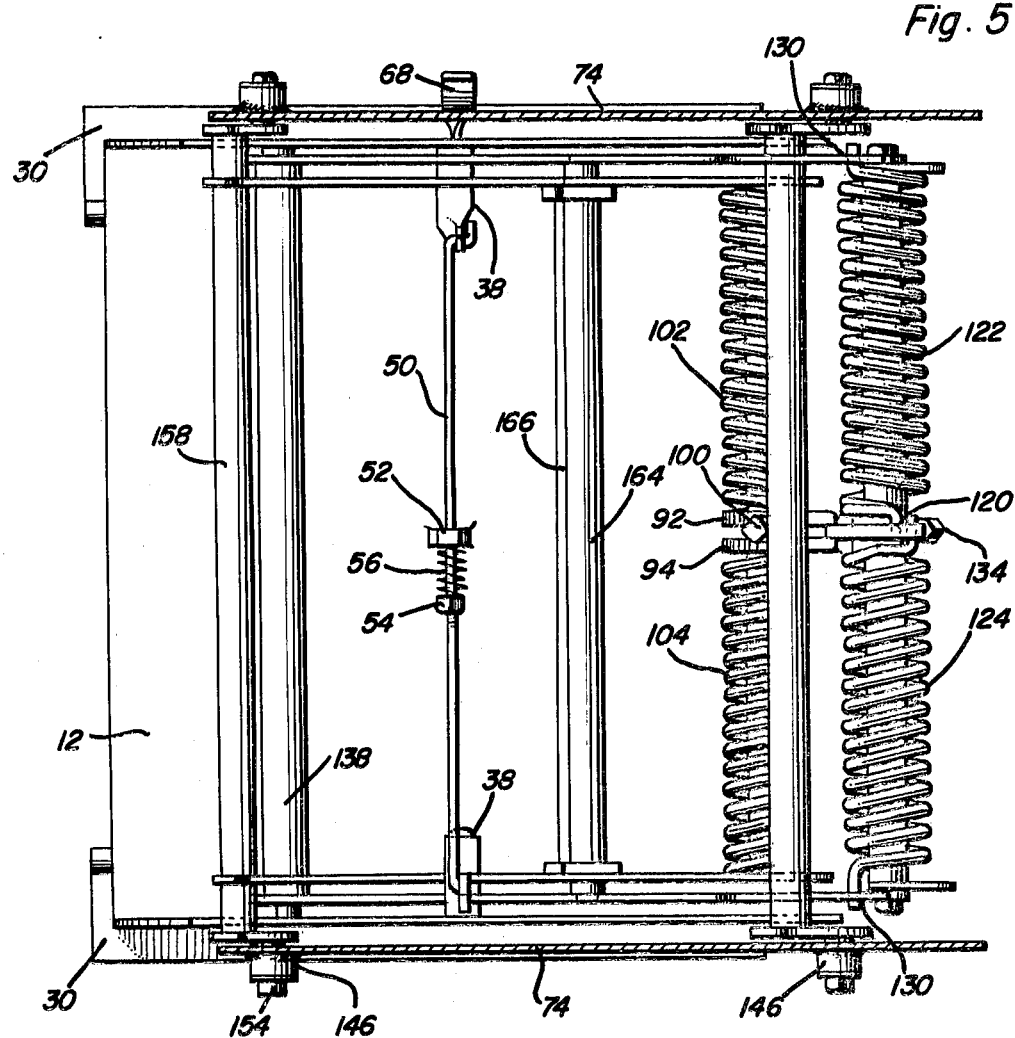
FIG. 5 is a horizontal sectional view taken substantially upon the plane indicated by the section line 5—5 of FIG. 2.
Figure 6:
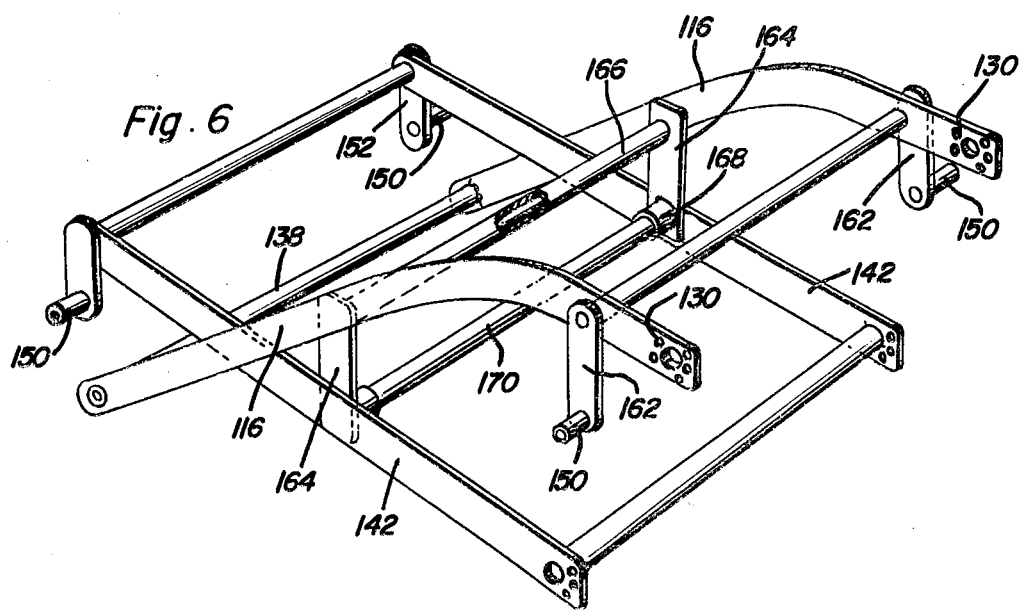
FIG. 6 is a perspective view of the pivoted levers and links by which the seat support structure is supported from the base.

In addition to the shaft 80, an upper shaft 114 extends between and is rotatably secured through the upper forward ends of a pair of forwardly and upwardly inclined support arms 116. The shaft 114 includes a bifurcated crank arm 118 secured to its midportion and a lever arm 120 is mounted on the shaft 114 intermediate the furcations of the crank arm 118 and for rotation relative to the shaft 114. A pair of torsion springs 122 and 124 are disposed about opposite end portions of the shaft 114 and have their adjacent ends anchored to the lever arm 120 as at 126 and 128. The remote ends of the torsion springs 122 and 124 are anchored relative to the upper forward ends of the arms 116 as at 130, see FIG. 5.

The crank arm 118 includes a nut 132 corresponding to the nut 98 secured between its furcations and an adjustment screw 134 is threaded through the nut 132 and is abutted against the lever arm 120. Further, the free end of the crank arm 118 is pivotally connected between the free ends of the crank arms 92 and 94 as at 136.

The rear lower ends of the arms 116 include sleeves 138 rotatable on the opposite ends of a shaft 140 secured through and extending between rear lower portions of the flanges 14 and 16. Further, a pair of opposite side forwardly and downwardly inclined arms 142 are provided and the forward lower ends of the arms 142 are anchored relative to the sleeves 82 and 84 on the shaft 80. The rear lower portions of the flanges 74 and 76 have outwardly projecting bearing bosses 146 supported therefrom in which bearings 148 are held captive and stub shafts 150 carried by the lower ends of a pair of rear suspension links 152 are rotatably received through the bearings 148 and secured through the bearings 148 by means of threaded fasteners 154 threaded in blind bores formed in the stub shafts 150 and retaining washers 156 over the outer ends of the bosses 146.

The upper ends of the suspension links 152 include opposing sleeves 158 rotatably mounted on opposite end portions of a shaft 160 secured to and extending between the upper rear marginal portions of the flanges 74 and 76. Further, similar front suspension links 162 are connected between the upper forward end portions of the arms 116 and the forward end portions of the lower marginal edges of the flanges 74 and 76 in substantially the same manner as the suspension links 152 are connected between the upper rear ends of the arms 142 and the flanges 74 and 76.

A pair of opposite side control links 164 include upper ends rotatably mounted on the opposite ends of a transverse shaft 166 and lower end sleeves 168 rotatably mounted on opposite end portions of a transverse lower shaft 170, the shafts 166 and 170 being secured and extending between the upper end portions of the arms 116 and the lower end portions of the arms 142.

In operation, as a person lowers his weight on the seat cushion 78, the mounting plate 72 is biased downwardly from the position illustrated in FIG. 2 to the position illustrated in FIG. 3. During this movement, the crank arms 92 and 94 swing through an arc of approximately 60 degrees forwardly and downwardly to substantially horizontal positions and the crank arm 118 swings forwardly at its lower end, relative to the forward ends of the arms 116, slightly less than 20 degrees. Accordingly, while both sets of springs 102, 104 and 122, 124 are pretensioned and the pretensioning thereof may be adjusted by adjustment of the screws 100 and 134, respectively, the tension of the torsion springs 102 and 104 is considerably more greatly increased than the tension of the torsion springs 122 and 124 is increased during movement of the mounting panel or plates 72 from the upper position thereof illustrated in FIG. 2 downwardly to the lower limit position thereof illustrated in FIG. 3.

Thus, it may be readily seen that the adjustment screw 134 may be adjusted to compensate for a rougher road and the adjustment screw 100 may be adjusted to compensate for a heavier driver.

The front and rear suspension links 162 and 152 allow the upper positions of arms 116 and 142 to vary in distance relative to the up and down movement of the seat support structure 70. The suspension links 162 and 152 also serve to absorb the seat "backslap" usually associated with wheel hop caused by the associated vehicle encountering a corrugated road surface.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A seat mounting structure including a base and generally horizontal seat support means disposed above the base, spring controlled mounting means supporting the seat support means from the base for generally vertical movement relative thereto between upper and lower limit positions while maintaining said seat support means generally horizontally disposed, said spring controlled mounting means including first and second pretensioned spring means yieldingly resisting downward movement of said seat support means from said upper limit position toward said lower limit position, one of said spring means increasing in tension slowly during downward movement of said seat support means and the other of said spring means increasing in tension more rapidly during downward movement of said seat support means, said base and seat support means including corresponding opposite side portions, said mounting means including a pair of crossed front to rear extending first and second arms inclined forwardly and upwardly and forwardly and downwardly interconnected between the pairs of corresponding side portions of said base and seat support means, front and rear upstanding suspension links supported at their lower ends from each side portion of said seat support means for oscillation about horizontal transverse axes, the rear upper ends of said second arms being pivotally attached to the upper ends of said rear links, the front upper ends of said first arms being pivotally attached to the upper ends of said front links, a forward transverse upper shaft supported from and extending between the forward ends of said first arms, a forward transverse lower shaft extending between opposite sides of said base, central sleeves mounted on said upper and lower shafts and including downwardly and upwardly projecting crank arm means, pairs of upper and lower coiled torsion springs disposed about said upper and lower shafts on opposite sides of the corresponding crank arm means, means anchoring the adjacent ends of each pair of springs to the corresponding crank arm means and the remote ends of corresponding upper and lower springs to the forward upper and lower ends of said first and second arms, and means pivotally connecting the lower and upper ends of said downwardly and upwardly projecting crank arm means, respectively.

2. The combination of claim 1, including selectively independently operable adjustment means operatively associated with each pair of coiled torsion springs.

3. The combination of claim 2, wherein each of said adjustment means includes a single adjustment operator for simultaneously and equally adjusting the corresponding pair of torsion springs.

4. The combination of claim 1, wherein said means anchoring the adjacent ends of said upper springs to the corresponding crank arm means includes means operative to adjustably vary the tension of said upper springs.

5. The combination of claim 4, wherein said means anchoring the adjacent ends of said lower springs to the corresponding crank arm means includes means operative to adjustably vary the tension of said lower springs.

6. A seat mounting structure including a base and generally horizontal seat support means disposed above the base, spring controlled mounting means supporting the seat support means from the base for generally vertical movement relative thereto between upper and lower limit positions while maintaining said seat support means generally horizontally disposed, said spring controlled mounting means including first and second pretensioned spring means yieldingly resisting downward movement of said seat support means from said upper limit position toward said lower limit position, said mounting means including a pair of crossed front to rear extending first and second arms inclined forwardly and upwardly and forwardly and downwardly interconnected between the pairs of corresponding side portions of said base and seat support means, front and rear upstandinging suspension links supported at their lower ends from each side portions of said seat support means for oscillation about horizontal transverse axes, the rear upper ends of said second levers being pivotally attached to the upper ends of said rear links, the front upper ends of said first arms being pivotally attached to the upper ends of said front links, a forward transverse upper shaft supported from and extending between the forward ends of said first arms, a forward transverse lower shaft extending between opposite sides of said base, central sleeves mounted on said upper and lower shafts and including downwardly and upwardly projecting crank arm means, pairs of upper and lower coiled torsion springs disposed about said upper and lower shafts on opposite sides of the corresponding crank arm means, means anchoring the adjacent ends of each pair of springs to the corresponding crank arm means and the remote ends of corresponding upper and lower springs to the forward upper and lower ends of said first and second arms, and means pivotally connecting the lower and upper ends of said downwardly and upwardly projecting crank arm means, respectively.

7. The combination of claim 6, wherein said means anchoring the adjacent ends of said upper springs to the corresponding crank arm means includes means operative to adjustably vary the tension of said upper springs.

8. The combination of claim 7, wherein said means anchoring the adjacent ends of said lower springs to the corresponding crank arm means includes means operative to adjustably vary the tension of said lower springs.

9. A seat mounting structure including a base and generally horizontal seat support means disposed above the base, spring controlled mounting means supporting the seat support means from the base for generally vertical movement relative thereto between upper and lower limit positions while maintaining said seat support means generally horizontally disposed, said spring controlled mounting means including first and second pretensioned spring means yieldingly resisting downward movement of said seat support means from said upper limit position toward said lower limit position, one of said spring means increasing in tension slowly during downward movement of said seat support means and the other of said spring means increasing in tension more rapidly during downward movement of said seat support means, said base defining a pair of opposite side, parallel and front to rear extending horizontal and downwardly opening C-shaped followers supported therefrom, a pair of longitudinal edge upstanding horizontal mounting flanges, guide bars extending along and supported from the upper longitudinal edge of said flanges with said followers guidingly and slidingly engaged over said bars and the upper marginal edges of said flanges slidably received through the open lower sides of said followers, and latch means operatively associated with said followers and flanges for releasably retaining said followers in adjusted shifted positions along said bars.

10. The combination of claim 9, wherein said latch means includes limit means establishing limits of movement of said followers along said bars.

11. The combination of claim 10, wherein at least one of said flanges includes a longitudinal slot formed therein along its upper marginal edge portion defining said limit means, said latch means including a bell crank slidably and rotatably mounted on the corresponding bar and slidably received in said slot, said flange including outwardly opening notches formed therein along said slot, the followers engaged with the bar supported from said one flange including longitudinally spaced opposite end portions, said bell crank being snugly received between said opposite end portions and including an arm selectively receivable in said notches.

12. A seat mounting structure including a base and generally horizontal seat support means disposed above the base, spring controlled mounting means supporting the seat support means from the base for generally vertical movement relative thereto between upper and lower limit positions while maintaining said seat support means generally horizontally disposed, said base defining a pair of opposite side, parallel and front to rear extending horizontal and downwardly opening C-shaped followers supported therefrom, a pair of longitudinal edge upstanding horizontal mounting flanges, guide bars extending along and supported from the upper longitudinal edge of said flanges with said followers guidingly and slidingly engaged over said bars and the upper marginal edges of said flanges slidingly received through the open lower sides of said followers, and latch means operatively associated with said followers and flanges for releasably retaining said followers in adjusted shifted positions along said bars, said latch means including limit means establishing limits of movement of said followers along said bars, at least one of said flanges including a longitudinal slot formed therein along its upper marginal edge portion defining said limit means, said latch means including a bell crank slidably and rotatably mounted on the corresponding bar and slidably received in said slot, said flange including outwardly opening notches formed therein along said slot, the follower engaged with the bar supported from said one flange including longitudinally spaced opposite end portions, said bell crank being snugly received between said opposite end portions and including an arm selectively receivable in said notches.

13. A seat mounting structure including a base and generally horizontal seat support means disposed above the base, spring controlled mounting means supporting the seat support means from the base for generally vertical movement relative thereto between upper and lower limit positions while maintaining said seat support means generally horizontally disposed, said spring controlled mounting means including first and second pretensioned spring means yieldingly resisting downward movement of said seat support means from said upper limit position toward said lower limit position, said base and seat support means including corresponding opposite side portions, said mounting means including a pair of crossed front to rear extending first and second arms inclined forwardly and upwardly and forwardly and downwardly interconnected between the pairs of corresponding side portions of said base and seat support means, front and rear upstanding suspension links supported at their lower ends from each side portion of said seat support means for oscillation about horizontal transverse axes, the rear upper ends of said second arms being pivotally attached to the upper ends of said rear links, the front upper ends of said first arms being pivotally attached to the upper ends of said front links, a forward transverse upper shaft supported from and extending between the forward ends of said first arms, a forward transverse lower shaft extending between opposite sides of said base, central sleeves mounted on said upper and lower shafts and including downwardly and upwardly projecting crank arm means, pairs of upper and lower coiled torsion springs disposed about said upper and lower shafts on opposite sides of the corresponding crank arm means, means anchoring the adjacent ends of each pair of springs to the corresponding crank arm means and the remote ends of corresponding upper and lower springs to the forward upper and lower ends of said first and second arms, and means pivotally connecting the lower and upper ends of said downwardly and upwardly projecting crank arm means, respectively.

14. The combination of claim 13 including selectively independently operable adjustment means operatively associated with each pair of coiled torsion springs for varying the pretensioning thereof.

* * * * *